United States Patent
Yonezawa

(10) Patent No.: US 8,950,588 B2
(45) Date of Patent: Feb. 10, 2015

(54) BAND TYPE FILTER

(75) Inventor: Kenji Yonezawa, Kanagawa (JP)

(73) Assignee: Piolax Inc., Yokohama-Shi, Kanagawa (JP)

(*) Notice: Subject to any disclaimer, the term of this patent is extended or adjusted under 35 U.S.C. 154(b) by 1510 days.

(21) Appl. No.: 12/232,975

(22) Filed: Sep. 26, 2008

(65) Prior Publication Data

US 2009/0084727 A1 Apr. 2, 2009

(30) Foreign Application Priority Data

Sep. 28, 2007 (JP) ................................. P2007-253938

(51) Int. Cl.
| | | |
|---|---|---|
| *B01D 29/11* | (2006.01) | |
| *F16K 11/07* | (2006.01) | |
| *B01D 29/00* | (2006.01) | |
| *F01L 1/344* | (2006.01) | |

(52) U.S. Cl.
CPC ............... *F16K 11/07* (2013.01); *F01L 1/3442* (2013.01); *F01L 2001/3443* (2013.01); *F01L 2001/3444* (2013.01)
USPC ...... 210/495; 210/232; 210/485; 210/497.01; 210/499

(58) Field of Classification Search
CPC ........... B01D 29/0015; B01D 29/0018; B01D 29/0097
USPC ............ 210/495, 232, 485, 497.01, 499, 400, 210/430, 432; 55/497
See application file for complete search history.

(56) References Cited

U.S. PATENT DOCUMENTS

| | | | | |
|---|---|---|---|---|
| 3,620,375 | A | * | 11/1971 | Atkins .......................... 210/484 |
| 4,014,796 | A | * | 3/1977 | Sugiyama et al. ............. 210/437 |
| 5,102,436 | A | * | 4/1992 | Grabowski ...................... 55/483 |
| 5,169,524 | A | * | 12/1992 | Meiritz et al. ................. 210/232 |
| 5,820,754 | A | * | 10/1998 | Cassidy et al. ................ 210/232 |
| 6,517,718 | B2 | * | 2/2003 | Gutierrez et al. ............. 210/232 |
| 6,848,404 | B2 | * | 2/2005 | Maeyama et al. .......... 123/90.17 |

(Continued)

FOREIGN PATENT DOCUMENTS

| | | |
|---|---|---|
| JP | H11-276817 (A) | 10/1999 |
| JP | 2000-266235 A | 9/2000 |
| JP | 2005-325920 A | 11/2005 |
| JP | 2006-22816 A | 1/2006 |

(Continued)

OTHER PUBLICATIONS

Notification of Reason(s) for Refusal dated Mar. 15, 2011, with English translation.
German Office Action dated Apr. 19, 2013 with English translation.

*Primary Examiner* — Nam Nguyen
*Assistant Examiner* — Madeline Gonzalez
(74) *Attorney, Agent, or Firm* — McGinn IP Law Group, PLLC

(57) ABSTRACT

According to an aspect of the present invention, there is provided a filter including: a belt shaped frame formed of a resin, an opening being provided inside the frame; a pair of link portions formed on the frame at both distal ends thereof to be engagable with each other; and a filtering member provided in the opening, wherein the frame is formed to have a flat plate shape or a curved shape that has a center angle equal to or less than 180 degrees in a state where the pair of link portions are not engaged, and wherein a plurality of grooves are formed on at least one surface of the frame at intervals along the longitudinal direction.

20 Claims, 9 Drawing Sheets

(56) References Cited

U.S. PATENT DOCUMENTS 7,041,217 B1 * 5/2006 Close et al. .................. 210/232
8,186,378 B2 * 5/2012 Nordstrom et al. ........... 137/550

FOREIGN PATENT DOCUMENTS

| JP | 2006-105247 A | 4/2006 |
| JP | 2007-791 | 1/2007 |

* cited by examiner

BAND TYPE FILTER

CROSS-REFERENCE TO RELATED APPLICATIONS

This application claims priority from Japanese Patent Application No. 2007-253938 filed on Sep. 28, 2007, the entire contents of which are incorporated herein by reference.

BACKGROUND OF THE INVENTION

1. Field of the Invention

An aspect of the present invention relates to a band type filter which is mounted, for example, on a tubular member such as a control valve for controlling the flow of oil inside an internal combustion engine of an automobile for preventing the inclusion of extraneous materials into the component.

2. Description of the Related Art

For example, many control valves are used in an internal combustion engine and an automatic transmission of an automobile for controlling the pressure of fluid such as oil and switching flow paths of the oil. When extraneous materials in oil are included in such a control valve, there is caused a fear that a proper operation of the control valve is disturbed. Because of this, a filter is mounted in such a member as a control valve through which oil flows for capturing extraneous materials in the fluid to prevent the inclusion of the extraneous materials into the control valve.

As a filter of this type, JP-2007-791-A discloses a control valve filter having a substantially annular frame element, a filtering member provided on the frame element and elastic engagement portions provided at both distal ends of the frame element and adapted to be brought into engagement with each other, wherein the frame element is mounted in a circumferential groove formed on an outer circumferential surface of a control valve main body for filtering a fluid flowing into ports opened in the circumferential groove with the filtering member.

Incidentally, the frame element of JP-2007-791-A on which the filtering member is provided is formed into the substantially annular shape, that is, a shape which surrounds the circumferential groove formed on the outer circumferential surface of the control valve. Because of this, for example, in the case of a control valve having a cylindrically tubular shape, a frame element (filter) having a circularly annular shape is necessary, while in the case of a control having an angularly tubular shape, a frame element (filter) having an angularly annular shape is necessary. Thus, frame elements matching the shapes of control valves must be used respectively or filters cannot be mounted on control valves, leading to a problem that poorly versatile filters eventually increase the production costs of an automobile, for example.

In addition, a frame element such as that described above is formed by injecting a synthetic resin into a cavity of a mold, and in the event that a frame element has the substantially annular shape which surrounds the outer circumference of the control valve, when the molded frame element is attempted to be removed from a pair of split molds, since the frame element is caught by the molds, the frame element cannot be removed from such a pair of split molds. Because of this, to mold the frame element described above, a mold provided with a sliding mechanism is required, leading to a drawback that costs for molding machines and molds are increased. In addition, with a mold having a complex construction to include the sliding mechanism, it is difficult to mold a number of frame elements at the same time, and only one frame element has to be molded at one time, leading to a problem that mass production cannot be expected.

SUMMARY OF THE INVENTION

An object of the present invention is to provide a band type filter which is flexible enough to be mounted on a member on which the filter is to be mounted irrespective of the shape of the member, which can reduce the production costs and which can improve the mass production capability.

According to an aspect of the present invention, there is provided a band type filter including: a frame element that is formed into a belt shape and that is formed of a resin, an opening being provided inside the frame element; a pair of link portions that are formed on the frame element at both distal ends in a longitudinal direction of the frame element and that are formed to be engagable with each other; and a filtering member that is provided in the opening in the frame element, wherein the frame element is formed to have a flat plate shape or a curved shape that has a center angle equal to or less than 180 degrees in a state where the pair of link portions are not engaged, and wherein a plurality of grooves are formed on at least one surface of the frame element at intervals along the longitudinal direction.

In such a configuration, by bending curvedly the frame element to be coupled at both the end portions by the coupling means, the frame element can be mounted on a tubular member such as a control valve of an automobile, for example. As this occurs, since the plurality of concave grooves are formed on the frame element at the intervals along the longitudinal direction, whether the tubular member has a cylindrically tubular shape or an angularly tubular shape, the frame element can be bent into shapes matching those cylindrically and angularly tubular shapes for mounting.

In addition, since the frame element is formed into the flat plate shape or the curved shape whose center angle does not exceed 180 degrees in such a state that the both end portions are not coupled together, the frame element can be molded, for example, with a simple split-type mold, whereby the production costs can be reduced. In addition, since a number of frame elements can be molded with a single mold, the mass production capability can be increased.

Furthermore, when the frame element is bend curvedly so that both the end portions thereof are coupled together by the coupling means, since a reaction force to restore the original deployed shape of the frame element acts on the frame element, the engaging force by the coupling means is increased, whereby the end portions of the frame element can be rigidly coupled.

The grooves may be formed on both of surfaces of the frame element to not overlap with one another in the longitudinal direction.

In such a configuration, since the plurality of concave grooves are formed on both the front and rear sides of the frame element to deviate from each other so that the concave grooves do not overlap on the front and rear sides, the flexibility of the frame element can be increased further while ensuring the rigidity of the frame element.

The frame element may includes: a belt shaped portion on which the opening is formed; and a pair of support frames that are formed on both sides of the belt shaped portion along the longitudinal direction. The grooves may be formed on the support frames.

The frame element may further include a reinforcement rib formed to intersect with the support frames.

BRIEF DESCRIPTION OF THE DRAWINGS

These and other objects and advantages of this invention will become more fully apparent from the following detailed description taken with the accompanying drawings in which.

DETAILED DESCRIPTION OF THE EMBODIMENTS

Hereinafter, an embodiment of a band type filter of the invention will be described by reference to FIGS. 1 to 7B.

Figure 1:
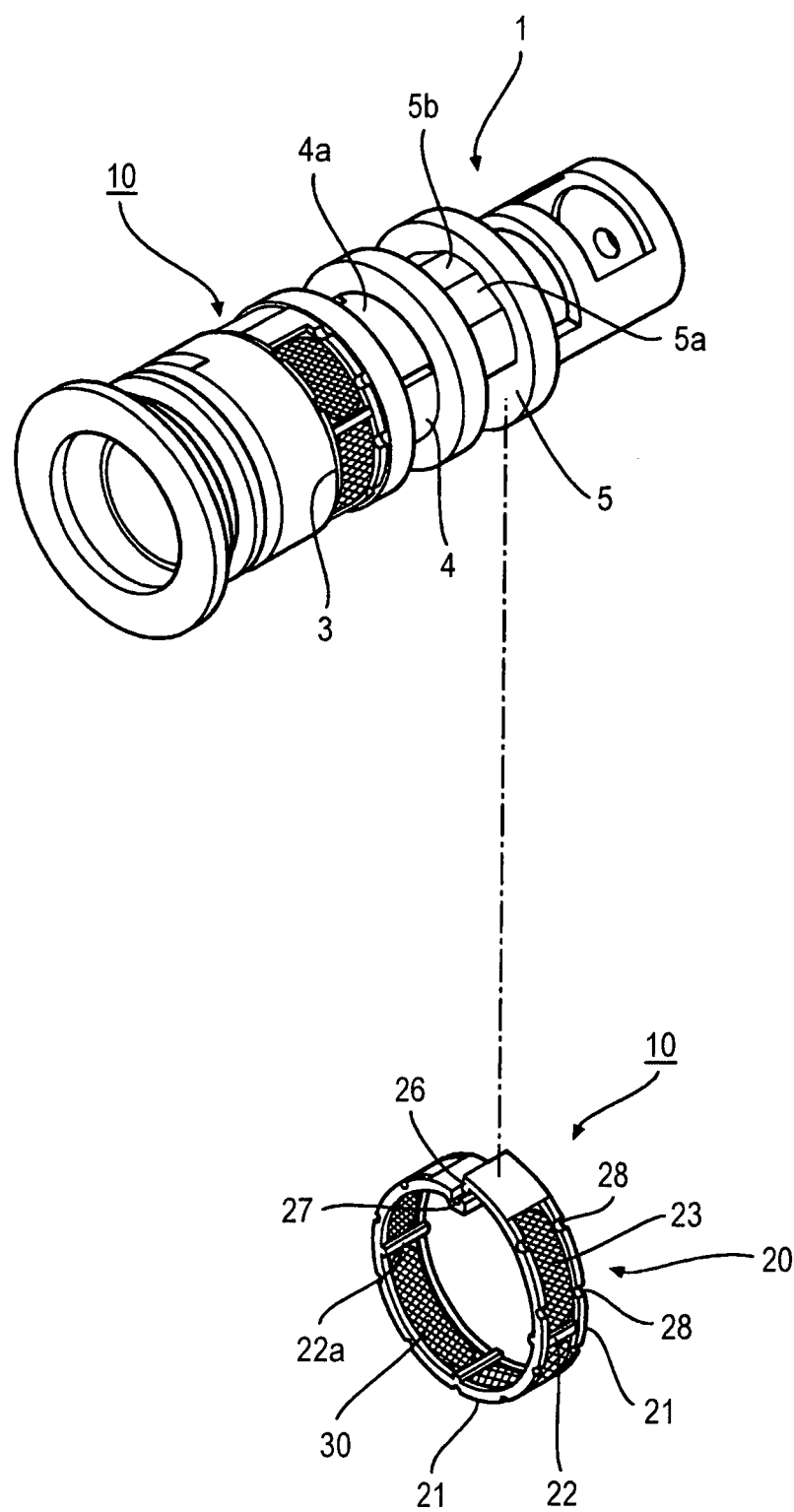
FIG. 1 is a perspective view showing a band type filter according to an embodiment of the present invention and a tubular member on which the filter is to be mounted.

As shown in FIG. 1, a band type filter 10 (hereinafter, referred to as a "filter 10") of the invention is such as to be mounted, for example, on a control valve 1 of an automobile. The control valve 1 is such as to be provided, for example, in a hydraulic circuit of an internal combustion engine of the automobile for switching flow paths of oil which flows inside the internal combustion engine and is formed into a substantially cylindrically tubular shape, a spool valve, not shown, being incorporated therein. A plurality of circumferential groves 3, 4, 5 are formed on an outer circumference of the control valve 1 at intervals along an axial direction thereof, and the filter 10 of the invention is to be mounted, respectively, in the circumferential grooves 3, 5 which lie on both sides of the circumferential groove 4 which is positioned in an axially central location.

Figure 6:
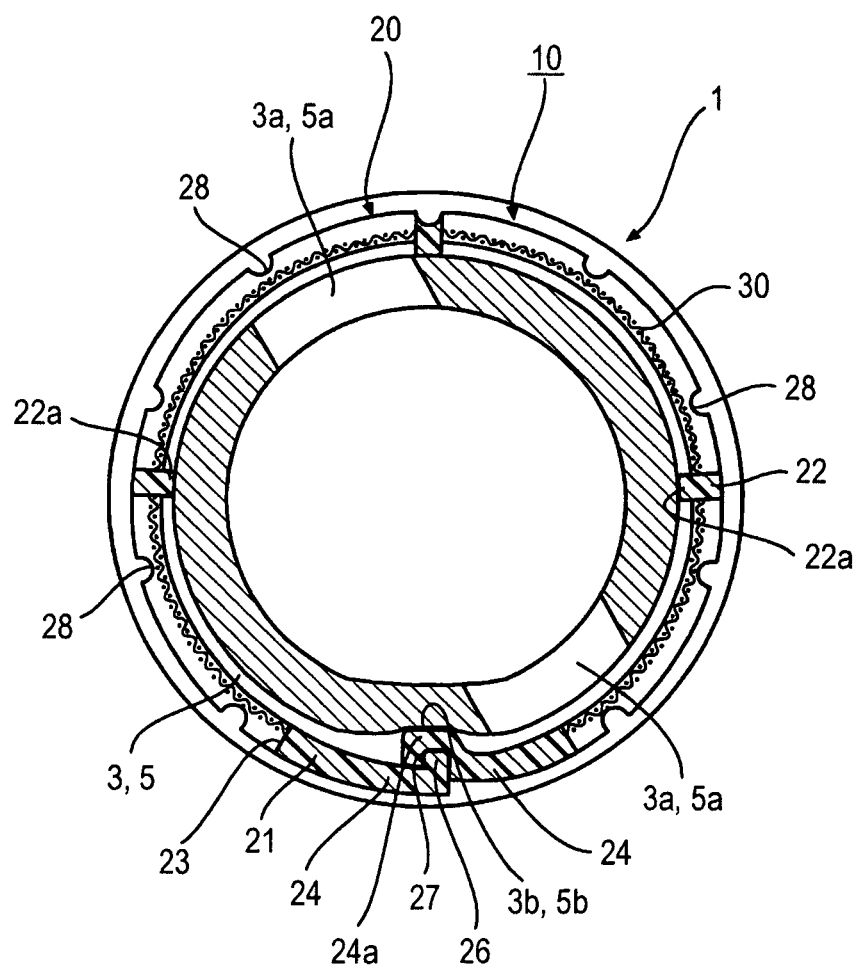
FIG. 6 is a sectional view showing a state in which the band type filter is mounted on a tubular member.

Referring to FIG. 6 as well as FIG. 1, port portions 3a, 4a, 5a are formed, respectively, in bottom surfaces of the circumferential grooves 3, 4, 5 so as to communicate with an interior of the control valve 1, and flow paths are made to be switched by the spool valve incorporated in the control valve 1 sliding in the axial direction. In addition, flat surfaces 3b, 5b cut to be flat are formed, respectively, in certain locations of the circumferential groves 3, 5 in which the filter 10 is to be mounted so as to constitute portions with which a rear side of a coupling piece 24 of the filter 10 where a coupling recess 27 is formed is to be brought into contact, the coupling recess 27 on the coupling piece 24 being described later (refer to FIGS. 1 and 6). In addition, in FIG. 6, the port portions 3a, 5a are shown as occupying the same location as a matter of convenience. In reality, however, although the port portions 3a, 5a are located in the same position in a circumferential direction, they constitute individual holes which are separated in the axial direction.

The filter 10 according to the embodiment is formed into a band shape to be mounted on a cylindrically tubular member, such as the control valve 1. To prevent extraneous materials from being mixed into the interior by capturing the extraneous materials contained in oil, the filter 10 is made up of a frame element 20 which is formed into a belt shape and which has openings 23 inside thereof and filtering members 30 which are each provided to extend over the opening 23.

Referring also to FIGS. 2 to 6, the belt-shaped frame element 20 has a pair of support frames 21, 21 which are provided in parallel with each other with a space provided therebetween, a plurality of reinforcement ribs 22 which are disposed at right angles to the pair of support frames 21, 21 so as to connect both the support frames 21, 21 together, the plurality of openings 23 which are defined by the support frames 21 and the plurality of reinforcement ribs 22, and coupling pieces 24, 24 which are provided continuously to longitudinal end portions of the support frames 21, 21, respectively, and these constituent parts are formed integrally from a synthetic resin so as to deflect freely.

Figure 2:
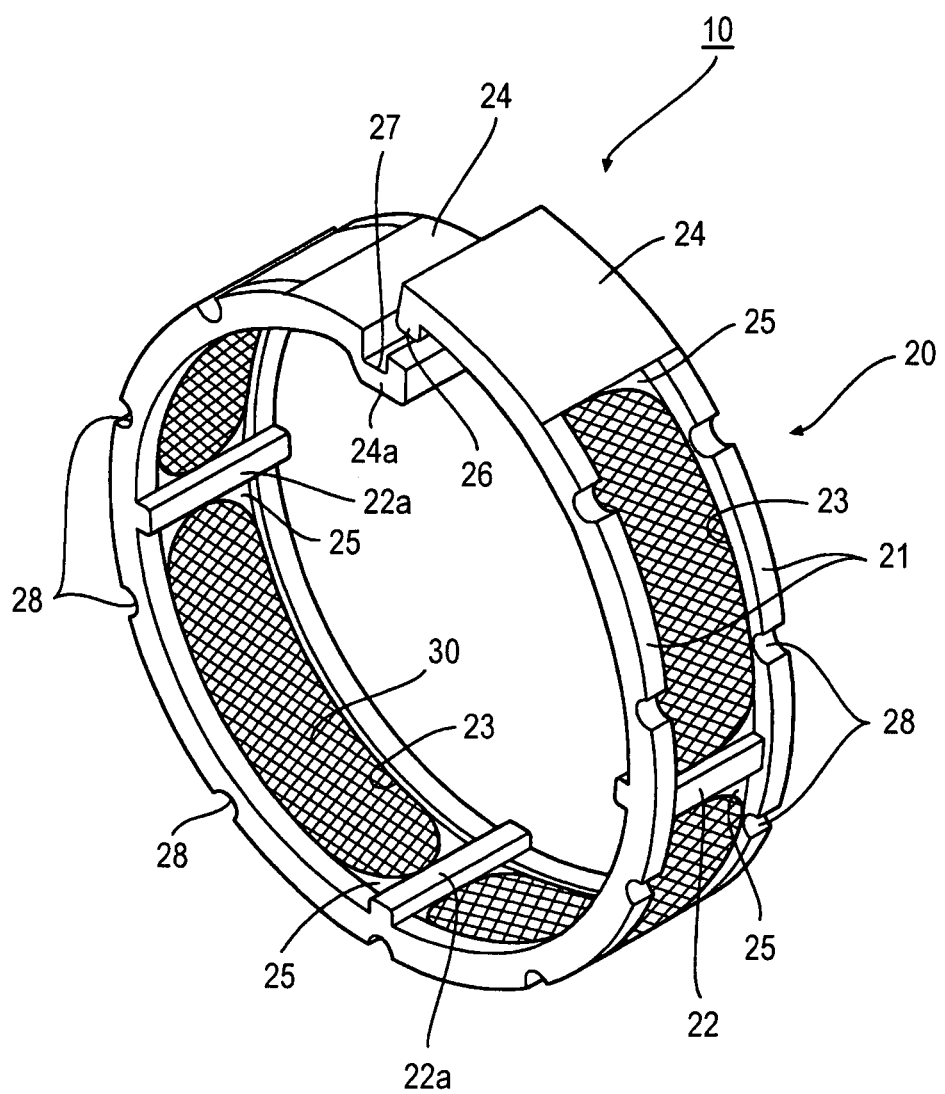
FIG. 2 is an enlarged perspective view of the band type filter.
Figure 3A:
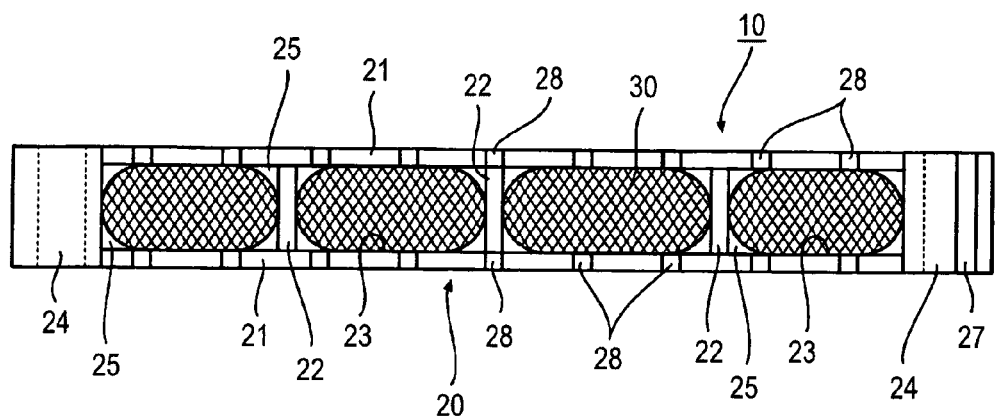
FIG. 3A is a plan view of the band type filter.
Figure 3B:
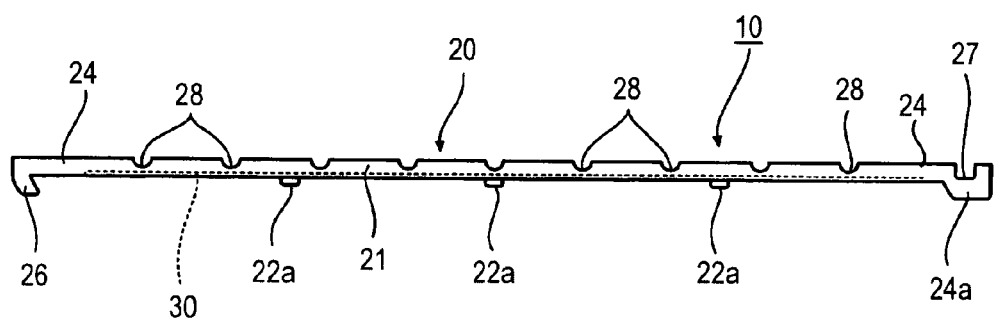
FIG. 3B is a front view of the band type filter.

In this embodiment, as shown in FIGS. 3A and 3B, the frame element 20 is formed into a flat plate shape in a free state in which both end portions are not coupled together by coupling means (which will be described later), and when the frame element 20 is mounted on the control valve 1, the frame element 20 is bent curvedly so that both the end portions are coupled together by the coupling means, whereby the frame element 20 is coupled into an annular shape as shown in FIGS. 1 and 2 and 6.

As the synthetic resin, resins having a heat resistance, for example, synthetic resins such as a polyamide-based resin like nylon, PBT (polybutylene terephthalate), and PPS (polyphenylene sulfide) are preferably used, and the synthetic resins may be strengthened by being mixed with grass fibers.

The reinforcement rib 22 is such as to reinforce the support frames 21, 21 to increase the rigidity of the frame element 20. Furthermore, arc-shaped fillet portions 25 made lower in height than the reinforcement ribs are formed in corner portions between the support frames 21, 21 and the reinforcement ribs 22 which intersect the same frames at right angles, so as to increase fluidity of a synthetic resin at the time of molding. In addition, a plurality of contact ribs 22a are provided, respectively, on rear sides of the plurality of reinforcement ribs 22 so as to intersect the pair of support frames 21, 21 at right angles, as well as project therefrom to a given height, and these contact ribs 22a are brought into contact with the bottom surfaces of the respective circumferential grooves 3, 5 when the filter 10 is mounted in those circumferential grooves of the control valve 1 to suppress the looseness of the filter 10 relative to the control valve 1.

In the description that has been made heretofore, the front side means an opposite side to the tubular member such as the control valve 1 when the filter 10 is mounted on the tubular member, that is, a side which constitutes an outer circumference, while the rear side means a side which faces the tubular member when the filter 10 is mounted on the tubular member, that is, a side which constitutes an inner circumference.

A coupling claw 26 is provided on a rear side of the coupling piece 24 which is provided at one longitudinal end portion of the frame element 20 so as to project therefrom. On the other hand, the coupling piece 24 provided at the other longitudinal end portion of the frame element 20 is formed such that a distal end portion 24a thereof projects to a given height towards the rear side, and a projecting surface of the distal end portion 24a is made into a flat surface to be brought into contact with the flat surfaces 3b, 5b of the respective circumferential grooves 3, 5 of the control valve 1 as shown in FIG. 6, whereby when the frame element 20 is mounted on the control valve 1, a detent to prevent the rotation of the filer 10 relative to the control valve 1 is realized. Furthermore, the coupling recess 27 is formed on a front side of the distal end portion 24a so as to form a groove having a depth. Then, by bending the frame element 20 in a curved fashion so as to bring the coupling claw 26 into engagement with the coupling recess 27, the frame element 20 is coupled into an annular shape (refer to FIGS. 1, 2 and 6). The coupling claw 26 and the coupling recess 27 constitute the coupling means. In FIGS. 1 and 2, in order to facilitate the understanding of what is shown therein, a state is depicted which results immediately before the coupling claw 26 is brought into engagement with the coupling recess 27.

In the filter 10 according to the embodiment, a plurality of concave grooves 28 are provided on at least one side of the frame element 20 at intervals along the length or longitudinal direction thereof so as to increase the flexibility of the filter 10.

To continue the description by reference to FIGS. 2, 3A and 3B, the plurality of concave grooves 28 are formed, respectively, on front sides of the pair of support frames 21, 21 at substantially equal intervals along the longitudinal direction thereof. As shown in FIG. 3A, the concave grooves 28 which are formed on the respective support frames 21, 21 are formed parallel to each other so as to be located in the same positions along the longitudinal direction of the support frames 21. In an exemplary embodiment, concave grooves 28 can overlap openings 23 in a longitudinal direction.

Figure 4A:
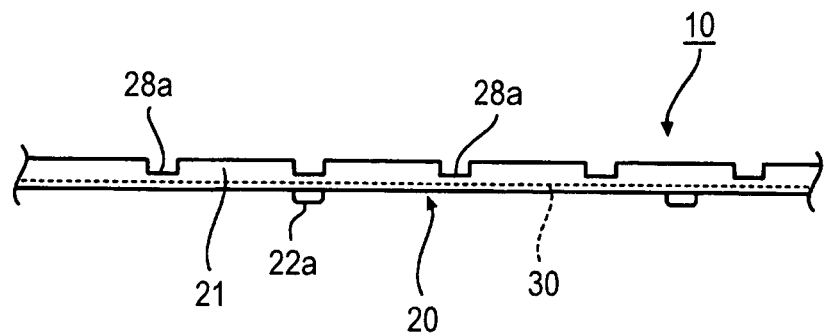
FIG. 4A is an enlarged front view showing another configuration of concave grooves.
Figure 4B:
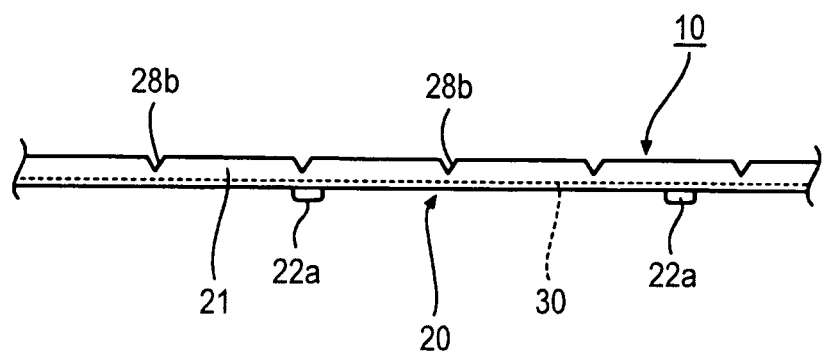
FIG. 4B is an enlarged front view showing still another configuration of concave grooves.

As shown in FIG. 3B, the concave grooves 28 are formed to a given depth along a thickness direction of the support frame 21, and in this embodiment, the concave grooves 28 are each formed into an arc-like curved shape. Note that the shape of the concave groove 28 is not limited to the arc-like shape, and hence, the concave groove 28 may be formed into a concave groove 28a having an angular groove shape which is cut to a constant width as shown in FIG. 4A or a concave groove 28b having a valley-like shape which gradually increases its width towards the surface of the front side as shown in FIG. 4B. The depth and width of the concave groove 28 can be changed as required depending upon rigidity and flexibility desired for the frame element 20, and for example, as to the depth thereof, a depth in the order of one half of the thickness of the support frame 21 is preferably adopted.

Thus, as has been described heretofore, by forming the a plurality of concave groove portions 28 respectively on the support frames 21, 21 along the longitudinal direction thereof, the thickness of the support frames 21 can be reduced so as to increase the flexibility thereof.

Mesh-like filtering members 30 which are formed by interlacing and/or assembling metallic line materials of stainless steel or the like are attached to a rear side of the frame element 20, resulting in a state in which the filtering members 30 are placed on the plurality of openings 23 so as to extend thereover. Namely, the filtering members 30 are set inside cavities provided in a mold for molding a filter 10, and a synthetic resin is injected into the cavities in such a state, whereby the filtering members 30 are integrally molded into a frame element 20.

In the filter 10 according to the embodiment, in addition to the provision of the concave grooves 28 in the manner described above, it constitutes another characteristic of the filter 10 that the frame element 20 is formed into a flat plate shape or a curved shape whose center angle does not exceed 180 degrees in such a state that both the end portions of the frame element 20 are not coupled together by the coupling means.

Figure 5:
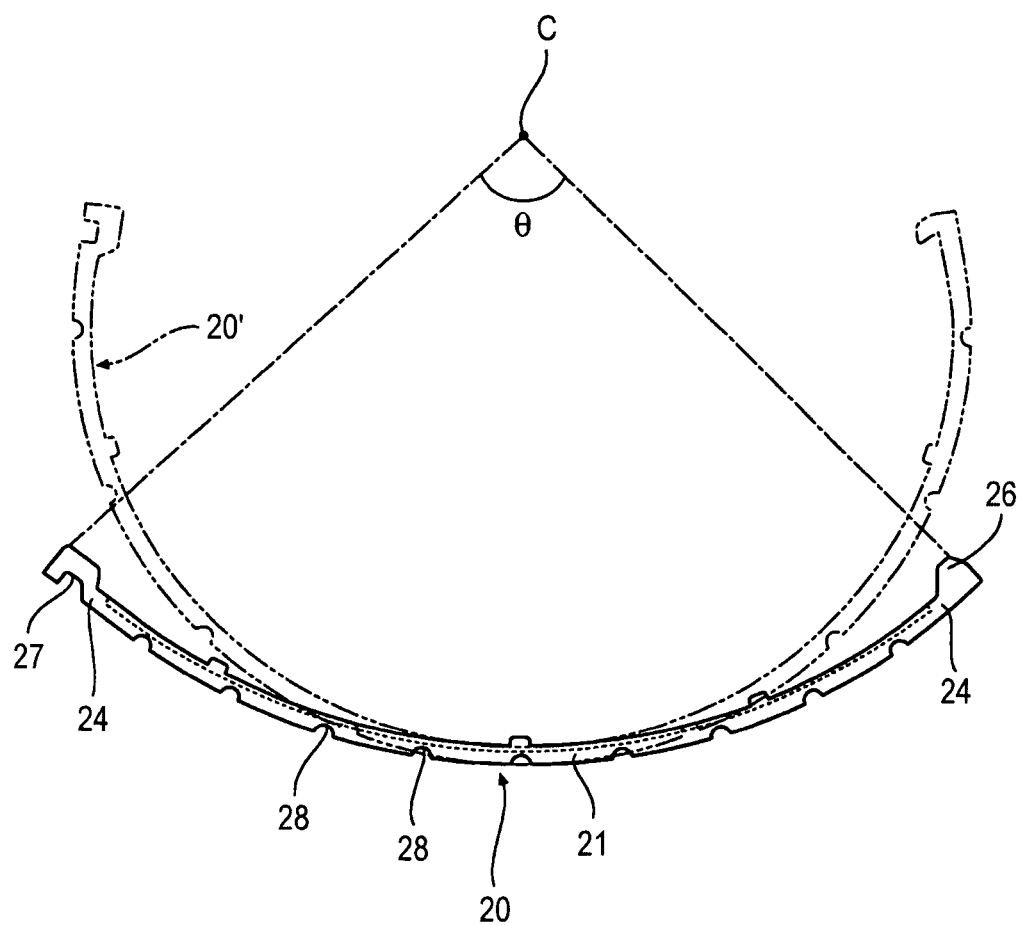
FIG. 5 is an explanatory drawing which explains a curved shape of a frame element of the band type filter.

Namely, in this embodiment, as shown in FIGS. 3A, 3B, the frame element 20 is formed into a flat plate shape in its free state in which both the end portions of the frame element 20 are not coupled together. In addition, the frame element 20 may be formed into a curved shape whose center angle θ does not exceed 180 degrees as shown in FIG. 5 in the free state in which both the end portions thereof are not coupled together. In this case, the center angle θ denotes an angle formed by both the end portions relative to a center C of the arc, when the curved shape of the frame element 20 is taken as having a substantially arc-like shape. Such the frame element 20 is preferable as compared with a curved frame element 20' whose center angle θ exceeds 180 degrees as indicated by imaginary lines in FIG. 5.

In a curved shape like the frame element 20' indicated by the imaginary lines in FIG. 5 whose center angle θ exceeds 180 degrees, even though a formed filter 10 is attempted to be removed from a mold that can be split vertically by splitting the mold in that way after a synthetic resin has been injected into a cavity in the vertically breakable mold, both end portions of a formed frame element 20 are caught on either the upper mold or the lower mold, this making it difficult to remove the filter 10 from the mold. On the other hand, with the curved shape whose center angle θ does not exceed 180 degrees, there is caused no situation in which the filter 10 is caught on the upper or lower mold, whereby the filter 10 can be removed from the mold. The center angle θ may be not greater than slightly smaller or greater than 120 degrees, and with such an angle, the ease with which the frame element 20 is molded and the ease with which the frame element 20 is bent can be ensured easily.

Next, how to use the filter 10 according to the embodiment which is configured as has been described heretofore will be described below.

A plurality of filters 10 formed into the flat plate shape as shown in FIGS. 3A, 3B are aligned with the circumferential grooves 3, 5 of the control valve 1 in which the filters are to be mounted with the side where the front side concave grooves 28 are formed made to lie on an outer side and the contact ribs 22a formed on the rear side made to lie on an inner side, and the filters 10 are then bent curvedly against the biasing force of the frame element 20. Then, the filters 10 are positioned properly by bringing the distal end portions 24a of the coupling pieces 24 of the respective filters 10 into contact with the flat surfaces 3b, 5b of the respective circumferential grooves 3, 5, and in association with this, the coupling claws 26 are brought into engagement with coupling recesses 27, respectively, whereby the plurality of filters 10 can be mounted in the circumferential grooves 3, 5, respectively, while the filters 10 are prevented from rotating relative to the circumferential grooves 3, 5 in such a state that the plurality of contact ribs 22a on the rear sides of the filters 10 are in contact with the bottom surfaces of the circumferential grooves 3, 5 so that the looseness of the filters 10 are prevented (refer to FIGS. 1 and 6).

As this occurs, in the filter 10 according to the embodiment, since the plurality of concave grooves 28 are formed thereon at the intervals along the longitudinal direction thereof, the thickness of the frame element 20 is reduced at the locations where the concave grooves 28 are formed so as to increase the flexibility of the frame element 20, whereby the frame element 20 is made to be bent easily. Due to this configuration, although the filter 10 is formed into the flat plate shape as described above, the filter 10 can be bent into the annular shape easily and smoothly so as to simply be mounted on the tubular member like the control valve 1 of the automobile shown in FIG. 1.

Figure 7A:
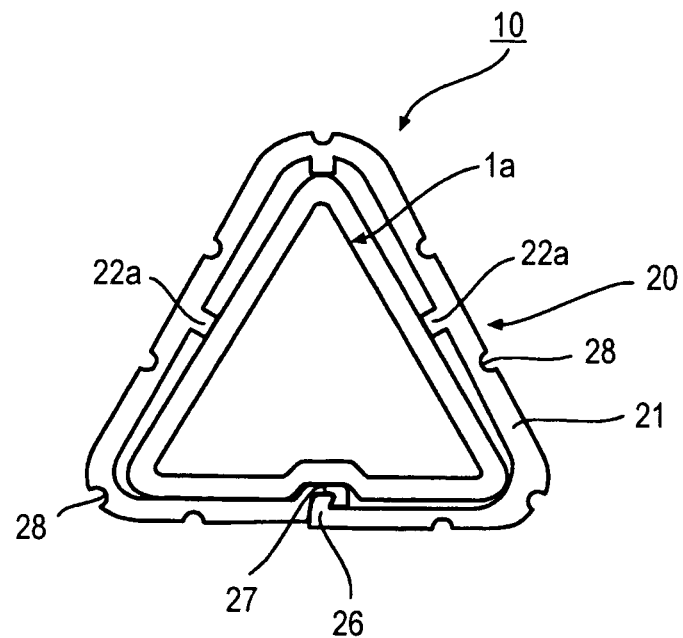
FIG. 7A is an explanatory drawing which shows a state in which the band type filter is mounted on a triangular tubular member.
Figure 7B:
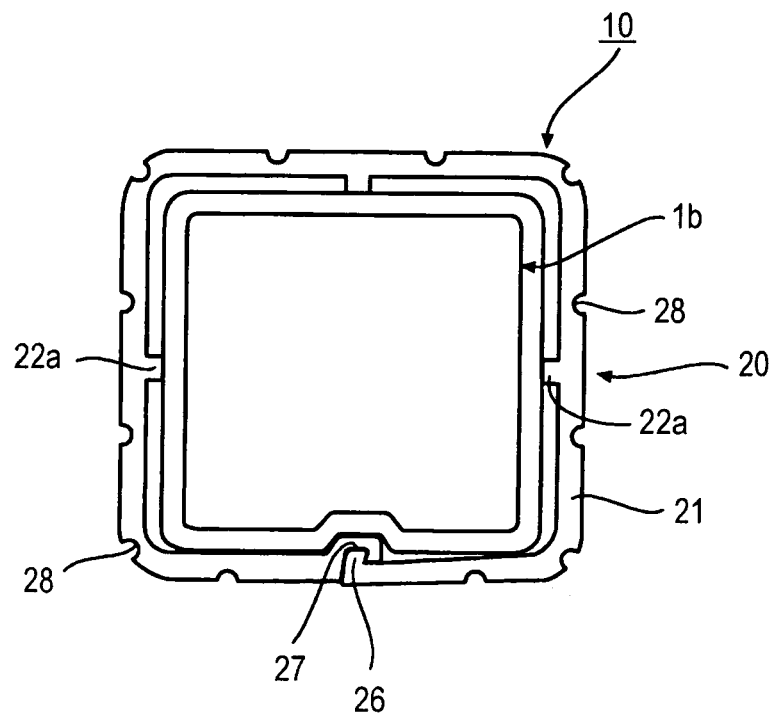
FIG. 7B is an explanatory drawing showing a state in which the band type filter is mounted on a quadrangular tubular member.

While in the embodiment, the control valve 1 is formed substantially into the cylindrically tubular shape, the filter 10 can also be mounted on members formed into other shapes than the cylindrically tubular shape. In the filter 10 according to the embodiment, since the frame element 20 is configured to be bent easily by the concave grooves 28 being formed thereon in the manner described above, the filter 10 can be bent to match for mounting tubular members of various cross section including a tubular member 1a formed into a triangular shape in cross section as shown in FIG. 7A, a tubular member 1b formed into a quadrangular shape in cross section as shown in FIG. 7B and, although not shown, a tubular member formed into an oval shape in cross section, thereby making it possible to provide the filter 10 which is rich in versatility.

In the filter 10 according to the embodiment, since the frame element 20 is formed into the flat plate shape (refer to FIGS. 3A and 3B) or the curved shape whose center angle θ does not exceed 180 degrees (refer to FIG. 5) in its free state in which both the end portions thereof are not coupled together, the frame element 20 can be molded, for example, with a relatively simple mold which can be split vertically, so as to reduce the production costs thereof, and moreover, since a number of such frame elements can be molded with one mold, the mass production capability can be increased.

Furthermore, since the frame element 20 of the filter 10 is formed into the flat plate shape or the curved shape whose center angle θ does not exceed 180 degrees in its free state in which both the end portions thereof are not coupled together, when coupling the end portions of the frame element 20 to each other with the coupling claw 26 and the coupling recess 27 so as to form the filter 10 into the annular shape, the end portions of the frame element 20 are made to be coupled to each other against the biasing force of the frame element 20. Because of this, in such a state that the filter 10 is mounted on the tubular member like the control valve 1 shown in FIG. 6, since a reaction force acts on the frame element 20 which attempts to restore its original deployed shape, the engaging force between the coupling recess 27 and the coupling claw 26 which is in engagement therewith is increased, whereby both the end portions of the frame element 20 can be coupled together rigidly so that the filter 10 is not dislocated from the tubular member.

Figure 8A:
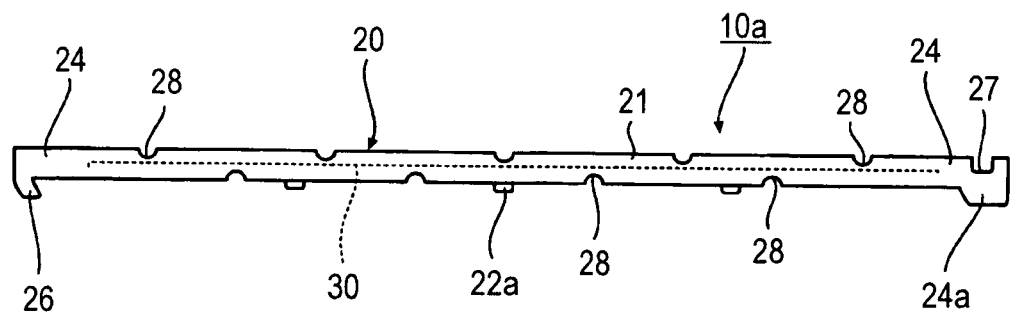
FIG. 8A is a front view of a band type filter according to another embodiment of the present invention.
Figure 8B:
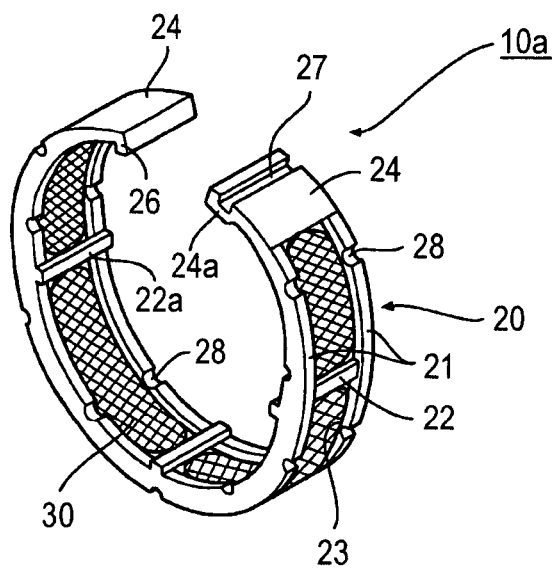
FIG. 8B is a perspective view of the band type filter.

FIGS. 8A and 8B show a filter according to another embodiment of the present invention. Like reference numerals will be imparted to like portions to those of the embodiment described above, and the description thereof will be omitted.

In contrast to the fact that the concave grooves 28 are provided only on the front side of the filter 10 in the previous embodiment, in a filter 10a of this embodiment, as shown in FIGS. 8A and 8B, a plurality of concave grooves 28 are formed on both front and rear sides thereof along a longitudinal direction thereof, and moreover, the concave grooves 28 which are so formed on the front and rear sides of the filter 10 are disposed to deviate from each other so that the concave grooves 28 do not overlap on the front and rear sides. In addition, the concave grooves 28 which are formed on both the front and rear sides of a frame element 20 are formed slightly shallower than the concave grooves 28 of the previous embodiment, and specifically, the concave grooves 28 are formed to have a depth around one third with respect to the thickness of a support frame 21 of the frame element 20. Since the concave grooves 28 are formed on both the front and rear sides of the frame element 20, filtering members 30 which are attached to the filter 10 are disposed substantially centrally in a thickness direction of the frame element 20.

According to the filter 10 of this embodiment, since the plurality of concave grooves 28 are formed on both the front and rear sides of the frame element 20 so as to deviate from each other so that the concave grooves 28 do not overlap on the front and rear sides, the flexibility of the frame element 20 can be increased further while ensuring the rigidity thereof.

Figure 9A:
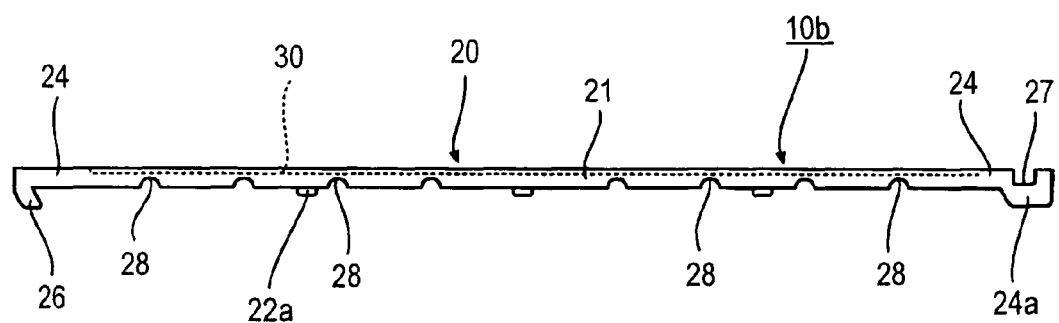
FIG. 9A is a front view of a band type filter according to still another embodiment of the present invention.
Figure 9B:
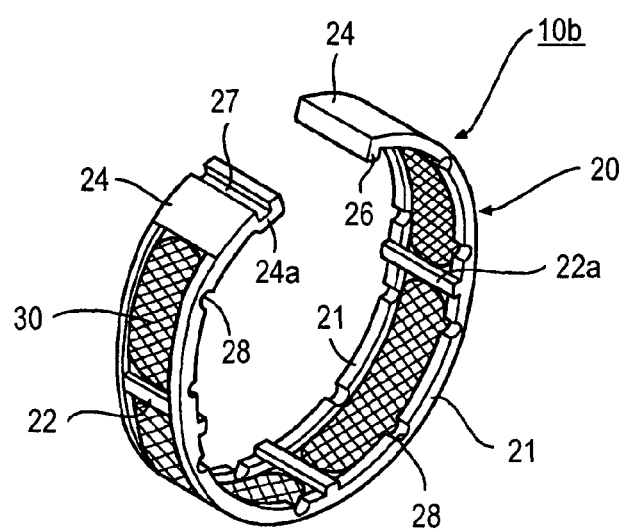
FIG. 9B is a perspective view of the band type filter.

FIGS. 9A and 9B show a filter according to still another embodiment of the present invention. Like reference numerals will be imparted to like portions to those of the embodiment described above, and the description thereof will be omitted.

In contrast to the fact that the concave grooves 28 are provided only on the front side of the filter 10 of the firstly-described embodiment, in a filter 10b of this embodiment, a plurality of concave grooves 28 are formed on a rear side (that is, a side which face a tubular member like the control valve 1) of a frame element 20. In association with this, filtering members 30 are attached to a front side of the frame element 20.

In this embodiment, as with the filter 10 of the firstly-described embodiment, since the frame element 20 is made to be bent easily by the concave groove 28 being so provided, the frame element 20 can be bent for mounting to match tubular members of various shapes.

According to the above-described embodiments, since the plurality of concave grooves are formed on the frame element at the intervals along the longitudinal direction, whether a tubular member such as a control valve of an automobile on which the filter is to be mounted has a cylindrically tubular shape, an angularly tubular shape or an oval tubular shape, the filter can be bent into a shape which match any of those shapes for mounting.

In addition, since the frame element is formed into the flat plate shape or the curved shape whose center angle does not exceed 180 degrees in such a state that the both end portions are not coupled together, not only can the frame element be molded, for example, with a relatively simple mold which is split vertically, but also a number of frame elements can be molded with a single mold, whereby the mass production capability can be increased.

Furthermore, when the frame element is bend curvedly so that both the end portions thereof are coupled together by the coupling means, since a reaction force to restore the original deployed shape of the frame element acts on the frame element, the engaging force by the coupling means is increased, whereby the end portions of the frame element can be rigidly coupled.

What is claimed is:
1. A band type filter, comprising:
   a frame element that is formed into a belt shape and that comprises a resin, an opening being provided inside the frame element;
   a pair of link portions that are formed on the frame element at both distal ends in a longitudinal direction of the frame element and that are formed to be engagable with each other; and
   a filtering member that is provided in the opening in the frame element,
   wherein the frame element is formed to comprise a flat plate shape or a curved shape that has a center angle, as measured along a length of the frame element, equal to or less than 180 degrees in a free state where the pair of link portions are not engaged, wherein a plurality of grooves are formed on at least one of an inner surface and an outer surface of a pair of support frames of the frame element, in a latitudinal direction of the frame element, at intervals along the longitudinal direction, such that at least one groove of the plurality of grooves is disposed so as to overlap the opening when viewed in a direction perpendicular to the longitudinal direction, and wherein the frame element includes said pair of support frames that are formed on both sides of the filtering member along the longitudinal direction, the opening being located between the pair of support frames.

2. The band type filter according to claim 1, wherein the grooves are formed on both of the inner surface and the outer surface of the pair of support frames of the frame element so as to not overlap with one another in the longitudinal direction.

3. The band type filter according to claim 1, wherein the frame element further includes:
a belt shaped portion on which the opening is formed.

4. The band type filter according to claim 3, wherein the frame element further includes a reinforcement rib formed to intersect with the pair of support frames.

5. The band type filter according to claim 1, wherein the plurality of grooves are formed on at least one of a radially inner surface and a radially outer surface of the frame element.

6. The band type filter according to claim 1, wherein the pair of link portions are disposed so as to oppose one another in a radial direction of the frame element when the pair of link portions engage with each other.

7. The band type filter according to claim 1, wherein the frame element comprises a flat surface disposed on a radially inner surface of the frame element where the pair of link portions engage with each other.

8. The band type filter according to claim 4, wherein the frame element further includes an arc-shaped fillet portion formed in a corner portion of a support frame of the pair of support frames and the reinforcement rib.

9. The band type filter according to claim 4, wherein the reinforcement rib intersects with a support frame of the pair of support frames at a right angle.

10. The band type filter according to claim 4, wherein the frame element further includes a contact rib disposed on a radially inner side of the reinforcement rib so as to protrude radially inward of the pair of support frames.

11. The band type filter according to claim 1, wherein the plurality of grooves are formed at substantially equal intervals from a link portion of the pair of link portions to another link portion of the pair of link portions.

12. The band type filter according to claim 1, wherein the pair of link portions are disposed so as to oppose one another in the direction perpendicular to the longitudinal direction when the pair of link portions engage with each other.

13. The band type filter according to claim 1, wherein the groove of the plurality of grooves comprises an arc-like shape.

14. The band type filter according to claim 1, wherein the groove of the plurality of grooves comprises a constant width.

15. The band type filter according to claim 1, wherein the groove of the plurality of grooves comprises a V-shape.

16. The band type filter according to claim 1, wherein the plurality of grooves are disposed on both sides of the opening.

17. The band type filter according to claim 1, wherein the frame element is formed to comprise the flat plate shape in the free state where the pair of link portions are not engaged.

18. The band type filter according to claim 1, wherein the frame element is formed to comprise the curved shape that has the center angle, as measured along the length of the frame element, equal to or less than 180 degrees in the free state where the pair of link portions are not engaged.

19. The band type filter according to claim 1, wherein the frame element comprises a substantially arc shape when in the free state.

20. The band type filter according to claim 1, wherein an entirety of the at least one groove of the plurality of grooves is disposed so as to overlap the opening when viewed in the direction perpendicular to the longitudinal direction.

\* \* \* \* \*